April 19, 1955  C. W. J. HEDBERG ET AL  2,706,533
GAS CONDITIONING METHOD AND APPARATUS
Filed May 22, 1953
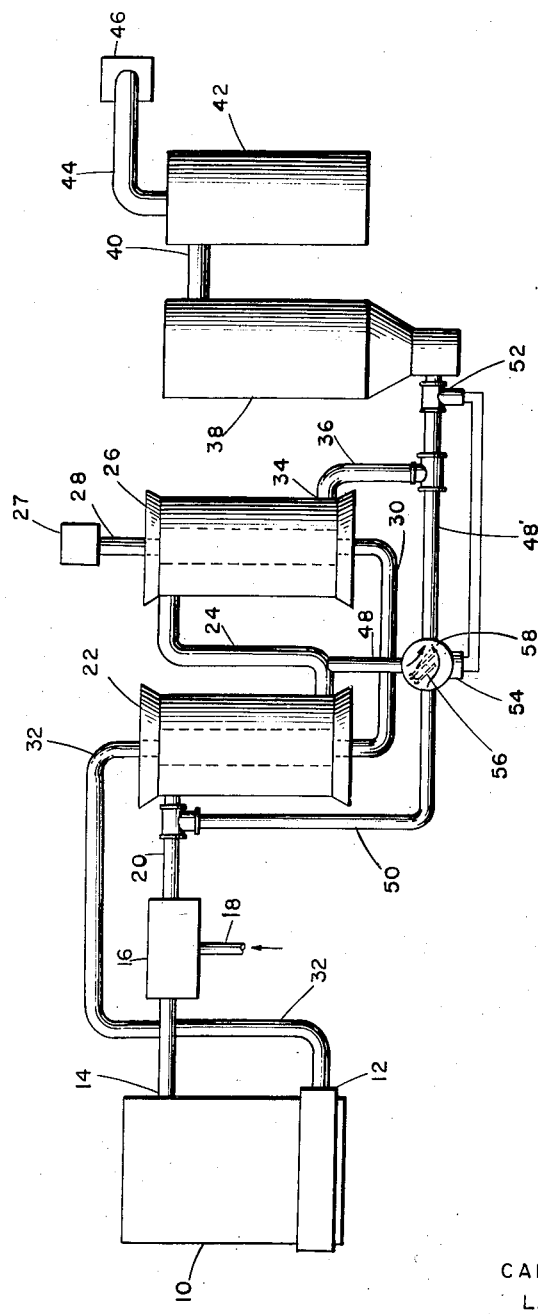
INVENTORS
CARL W.J. HEDBERG
LAWRENCE M. ROBERTS
BY *Harold T. Stowell*
ATTORNEY United States Patent Office 2,706,533
Patented Apr. 19, 1955

2,706,533

GAS CONDITIONING METHOD AND APPARATUS

Carl W. J. Hedberg and Lawrence M. Roberts, Bound Brook, N. J., assignors to Research Corporation, New York, N. Y., a corporation of New York Application May 22, 1953, Serial No. 356,844

5 Claims. (Cl. 183—7)

This invention relates to an improved method and apparatus for conditioning gases and more particularly, it relates to a method and apparatus for conditioning hot particle laden industrial gases for efficient gas cleaning in electrostatic precipitation apparatus.

In the cleaning of many gases by electrostatic precipitation it has been found that optimum collecting conditions are encountered in the electrostatic precipitator when the gases are conditioned with water. The presence of water apparently increases the conductivity of the suspended matter so that the optimum electrostatic effect takes place. The amount of water added to the hot gases to be cleaned is primarily limited by the fact that when too much water is added the dust becomes wet and soggy and cannot be effectively removed from the collecting electrodes. This is so because it is paramount in many gas cleaning problems that the particulate material be electrically precipitated in the dry state so that it is amenable to removal from the electrodes and to further dry disposal and handling. The operation of the gas conditioner, therefore, must be controlled so that an optimum amount of moisture is present in the dust from the electrostatic standpoint, yet an excessive amount of water which would cause a soggy deposit on the collecting electrodes must be prevented.

It is an object of the invention to provide a method and apparatus for conditioning hot gases with controlled predetermined amounts of liquid conditioning agents.

It is a further object to provide such method and apparatus that is efficient in operation and readily adjustable within wide limits.

A further object is to provide such a device that is relatively inexpensive to manufacture and install, and which substantially reduces operational down time for adjustment and repair over known gas conditioning devices.

These and other objects and advantages will be apparent from the following detailed description of the invention which will be described in reference to the cleaning of gases from cupolas as shown in the diagrammatic drawing in which the air blasts to the cupolas are preheated by means of heat exchange with the hot burned cupola gases.

With reference to the drawing, 10 is a typical hot blast cupola having a hot blast inlet conduit 12 and a discharge gas outlet 14.

The gases from the cupola 10 are drawn off by a fan through a combustion chamber 16. Air is added to the combustion chamber in controlled amounts through duct 18. The amount of air admixed with the cupola gases is controlled so that the temperature in the combustion chamber does not become excessive and exceed the characteristics of the combustion chamber. For example, a gas temperature of about 1600° F. at the outlet from the combustion chamber gives very satisfactory results. The main stream of the hot gases from the combustion chamber is directed by conduit 20 to a first heat exchanger 22, and by conduit 24 to a second heat exchanger 26.

Air for the hot blast of the cupola enters heat exchanger 26 through fan 27 and conduit 28 and leaves by conduit 30 which is connected to heat exchanger 22. The heated air from heat exchanger 22 is directed by conduit 32 to the inlet 12 of the cupola 10. In the example given wherein the temperature of the outlet gases from the combustion chamber 16 are at about 1600° F. a reduction in the temperature of the cupola gases to about 1200° F. at the discharge end of the first heat exchanger and to about 650° F. at the outlet 34 of the second heat exchanger will provide very satisfactory operation.

After leaving the second heat exchanger the cupola gases are directed by conduit 36 to a gas conditioner 38 of the water spray type. In the gas conditioner 38 the gases are further cooled and humidified to about 300° F. by the addition of water in the form of water droplets or mists formed by spraying water into the gases under pressure as is well known in the art. Thus, the gas conditioner acts as an evaporative cooler and not only cools the gases but also increases their moisture content. From the gas conditioner the cupola gases are directed by conduit 40 to the inlet of a standard dry type electrostatic precipitator 42 where the particulate material is removed. The clean gas leaves the precipitator through outlet conduit 44 and then to a fan 46 which prevents unwanted pressure drop in the cupola gas stream being treated.

The amount of water which can be added to the cupola gases in the spray conditioner 38 is limited by the difference in the temperature of the gases at the inlet and the outlet therefrom. The outlet temperature from the gas conditioner is limited at its lower end as it has been found that a temperature of about 300° F. is the optimum temperature for the inlet gases to the precipitator in that surface condensation on the exposed metal of the precipitator will not take place. Therefore the amount of water which can be added to the gases in the gas conditioner will depend to a great extent upon the temperature of the gases entering the gas conditioner. The higher the temperature of the gases entering the gas conditioner with a fixed outlet temperature the more moisture that can be added.

In the table this relationship is set forth for gas having a moisture content of about 4% upon entering the conditioner and wherein the specific heat of the gas is about 0.25.

Table

| Gas inlet temp., ° F. | Gas outlet temp., ° F. | Percent of $H_2O$ in gas at outlet |
|---|---|---|
| 600 | 250 | 14.65 |
| 700 | 250 | 17.60 |
| 800 | 250 | 20.15 |
| 900 | 250 | 22.60 |
| 600 | 300 | 13.25 |
| 700 | 300 | 16.08 |
| 800 | 300 | 18.67 |
| 900 | 300 | 21.15 |
| 600 | 350 | 11.73 |
| 700 | 350 | 14.55 |
| 800 | 350 | 17.22 |
| 900 | 350 | 19.72 |

From the table it will be seen that with a fixed gas temperature leaving the gas conditioner of about 300° F. the amount of water that can be added by evaporation can be increased from about 13.25% to about 21.15% by merely increasing the gas temperature entering the gas conditioner from 600° F. to about 900° F.

In order to provide the higher inlet temperature a portion of the hot gases from the cupola are by-passed around the first or second or both of the heat exchangers 22 and 26 to provide inlet temperatures to the gas conditioner higher than 600° F.

With reference to the drawing a by-pass conduit 48 and 48' connect conduits 24 and 36, and by-pass conduit 50 connects conduit 20 with by-pass conduit 48'.

In the conduit 36 adjacent the inlet to the gas conditioner there is provided a thermostat 52. The thermostat is electrically connected to a solenoid actuated gas flow control valve 54 positioned at the junction of by-pass conduits 48 and 50.

The valve 54 may be of any suitable type; however, for purposes of illustration the valve is shown as having two movable gates 56 and 58 each of which are halfway open so that half of the gas entering conduit 48′ is at a temperature of about 1600° F. and the other half is at a temperature of about 1200° F. By means of the two gates 56 and 58 the entire flow of gas in conduit 48′ may be at 1600° F. or 1200° F., or both gates can be entirely closed off so that none of the gases entering the gas conditioner by-pass the heat exchangers.

Through the use of the by-pass conduits and the thermostatically controlled mixer valve 54 the moisture content and the temperature of the gases passing to the precipitator are conveniently controlled without the necessity of costly and intricate controls for the numerous water sprays in the gas conditioning chamber which would be needed to compensate for the fluctuating inlet gas temperatures in industrial operations.

From the foregoing description it will be seen that the aims, objects and advantages of the invention are fully accomplished by the apparatus for cleaning hot dust laden industrial gases comprising a first heat exchanger, a second heat exchanger, an evaporative cooling gas conditioner, and an electrical precipitator, conduit means conducting gases to be cleaned serially through said first and second heat exchanger, gas conditioner and precipitator, temperature sensing means in the gas stream between the second heat exchanger and the precipitator, a first by-pass conduit means by-passing said first heat exchanger for supplying controlled amounts of hot gas into the gas stream ahead of said temperature sensing means, a second by-pass conduit means by-passing said second heat exchanger for supplying controlled amounts of partially cooled gas into the gas stream ahead of said temperature sensing means, and variable valve means in said first and second by-pass conduit means responsive to said temperature sensing means; and the method of cleaning a stream of hot dust laden industrial gases comprising removing a portion of the heat from a portion of the gas stream in a heat exchanger, passing the partially cooled gas through a gas conditioning chamber to effect further cooling and to increase the moisture content of the gases by the evaporation of water thereinto, controlling the temperature and the relative humidity of the gas stream leaving the gas conditioner by adding controlled portions of the uncooled gas stream to that portion of the gas stream leaving the heat exchanger, and then subjecting the cooled and humidified gas stream to electrical precipitation to remove the dust.

It will be evident that the apparatus shown and described by way of illustration may be variously modified and the specific gas temperatures disclosed may be widely varied in accordance with the type of precipitator, heat exchangers and the like employed. For example, in installations where only one heat exchanger is used to secure the same range of cooling in a single step only a single by-pass conduit to the gas conditioner would be required, and the two-gate valve 54 could be replaced with a single gate valve.

It will also be evident that the thermostat 52 could be located on the gas outlet side of gas conditioning chamber 38 without departing from the teachings of the invention.

We claim:
1. A method of cleaning a stream of hot dust laden industrial gases comprising removing a portion of the heat from a portion of the gas stream in a heat exchanger, passing the partially cooled gases through a gas conditioning chamber to effect further cooling and to increase the moisture content of the gases by the evaporation of water thereinto, controlling the temperature and the relative humidity of the gas stream leaving the gas conditioner by adding controlled portions of the uncooled gas stream to that portion of the gas stream leaving the heat exchanger, and then subjecting the cooled and humidified gas stream to electrical precipitation to remove the dust.

2. A method of cleaning a stream of hot dust laden industrial gases comprising removing a portion of the heat from a portion of the gas stream in a heat exchanger, passing the partially cooled gases through a gas conditioning chamber to effect further cooling and to increase the moisture content of the gases by the evaporation of water thereinto, sensing the temperature of the gases ahead of the gas conditioning chamber, controlling the temperature and the relative humidity of the gas stream leaving the gas conditioner in accordance with the sensed temperature by adding controlled portions of the uncooled gas stream to that portion of the gas stream leaving the heat exchanger, and then subjecting the cooled and humidified gas stream to electrical precipitation to remove the dust.

3. Apparatus for cleaning hot dust laden industrial gases comprising a heat exchanger, an evaporative cooling conditioner and an electrical precipitator, conduit means for conducting gases to be cleaned serially through said heat exchanger, conditioner and precipitator, temperature sensing means in the gas stream between the heat exchanger and the precipitator, conduit means by-passing said heat exchanger for supplying controlled amounts of hot gas into the gas stream ahead of said temperature sensing means and variable valve means in said by-pass conduit responsive to said temperature sensing means.

4. Apparatus for cleaning hot dust laden industrial gases comprising a heat exchanger, an evaporative cooling conditioner and an electrical precipitator, conduit means for conducting gases to be cleaned serially through said heat exchanger, conditioner and precipitator, temperature sensing means in the gas stream entering the gas conditioner, conduit means by-passing said heat exchanger for supplying controlled amounts of hot gas into the gas stream ahead of said temperature sensing means and variable valve means in said by-pass conduit responsive to said temperature sensing means.

5. Apparatus for cleaning hot dust laden industrial gases comprising a first heat exchanger, a second heat exchanger, an evaporative cooling gas conditioner, and an electrical precipitator, conduit means conducting gases to be cleaned serially through said first and second heat exchanger, gas conditioner and precipitator, temperature sensing means in the gas stream between the second heat exchanger and the precipitator, a first by-pass conduit means by-passing said first heat exchanger for supplying controlled amounts of hot gas into the gas stream ahead of said temperature sensing means, a second by-pass conduit means by-passing said second heat exchanger for supplying controlled amounts of partially cooled gas into the gas stream ahead of said temperature sensing means, and variable valve means in said first and second by-pass conduit means responsive to said temperature sensing means.

References Cited in the file of this patent

UNITED STATES PATENTS

| | | |
|---|---|---|
| 899,289 | Breamer | Sept. 22, 1908 |
| 1,837,797 | Shipley | Dec. 22, 1931 |
| 2,667,941 | Ekstrom | Feb. 2, 1954 |

FOREIGN PATENTS

| | | |
|---|---|---|
| 699,549 | France | Feb. 16, 1941 |